United States Patent
Kobayashi et al.

(10) Patent No.: US 6,794,470 B2
(45) Date of Patent: Sep. 21, 2004

(54) PROCESS FOR PRODUCING A TETRAFLUOROETHYLENE POLYMER

(75) Inventors: Shigeki Kobayashi, Ichihara (JP); Jun Hoshikawa, Ichihara (JP); Kazuo Kato, Ichihara (JP); Hiroki Kamiya, Ichihara (JP); Hiroyuki Hirai, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 15 days.

(21) Appl. No.: 10/290,371

(22) Filed: Nov. 8, 2002

(65) Prior Publication Data

US 2003/0065115 A1 Apr. 3, 2003

Related U.S. Application Data

(63) Continuation of application No. PCT/JP02/01876, filed on Feb. 28, 2002.

(30) Foreign Application Priority Data

Mar. 14, 2001 (JP) ........................................ 2001-072956
Nov. 13, 2001 (JP) ........................................ 2001-348060

(51) Int. Cl.$^7$ ............................................. C08F 114/18
(52) U.S. Cl. ........................ 526/250; 526/249; 203/67; 203/74
(58) Field of Search ................................ 526/250, 249; 203/67, 74

(56) References Cited

U.S. PATENT DOCUMENTS

| | | | | |
|---|---|---|---|---|
| 3,680,289 A | * | 8/1972 | Rudolph et al. | 95/180 |
| 3,804,910 A | * | 4/1974 | Furrow | 260/653.3 |
| 4,898,645 A | * | 2/1990 | Voigt et al. | 203/67 |
| 6,153,303 A | * | 11/2000 | Namura et al. | 428/421 |
| 6,518,381 B2 | | 2/2003 | Kobayashi et al. | 526/255 |
| 2003/0098228 A1 | * | 5/2003 | Yoshii et al. | 203/74 |

FOREIGN PATENT DOCUMENTS

| | | | |
|---|---|---|---|
| EP | 1016679 | * | 7/2000 |
| JP | 64-40507 | | 2/1989 |
| JP | 3-223219 A | * | 10/1991 |

OTHER PUBLICATIONS

U.S. patent application Ser. No. 10/022,426, Kobayashi et al., filed Dec. 20, 2001.
U.S. patent application Ser. No. 10/072,995, Kobayashi et al., filed Feb. 12, 2002.
U.S. patent application Ser. No. 10/314,992, Kobayashi et al., filed Dec. 10, 2002.
U.S. patent application Ser. No. 10/290,371, Kobayashi et al., filed Nov. 8, 2002.

* cited by examiner

*Primary Examiner*—Henry S Hu
(74) *Attorney, Agent, or Firm*—Oblon, Spivak, McClelland, Maier & Neustadt, P.C.

(57) ABSTRACT

A tetrafluoroethylene polymer is produced by polymerizing tetrafluoroethylene in the presence of an aqueous medium and a polymerization initiator, wherein the content of impurities (e.g. a saturated compound such as $CH_2F_2$ or $CHF_3$ and an unsaturated compound such as $CF_2=CFH$, $CF_2=CH_2$, $CF_2=CFCl$ or $CF_2=CHCl$) in the tetrafluoroethylene is not more than 100 ppm. By this method, PTFE which is uniform and stretchable at a high stretch ratio and which is excellent in the fibrillation property and has a high break strength, can be obtained.

14 Claims, No Drawings

PROCESS FOR PRODUCING A TETRAFLUOROETHYLENE POLYMER

This application is a Continuation of International application Ser. No. PCT/JP02/01876 filed on Feb. 28, 2002.

TECHNICAL FIELD

The present invention relates to a process for producing a tetrafluoroethylene polymer (hereinafter referred to as PTFE) which is stretchable at a high stretch ratio and which has high break strength under stretching.

TECHNICAL BACKGROUND

PTFE is used in various applications including various molding materials, highly stretchable low density tapes, uniform high strength stretchable porous materials, binders for fuel cells, etc.

PTFE can be produced by aqueous dispersion polymerization of tetrafluoroethylene (hereinafter referred to as TFE) and can be obtained in the form of an aqueous dispersion having fine PTFE particles dispersed, or can be obtained in the form of a fine powder by coagulating the aqueous dispersion, followed by drying.

Particularly, in its application to e.g. a low density tape, a porous material or a binder for a fuel cell, it is required to be uniformly stretchable to a high stretch ratio, and the obtained low density tape or stretched porous material is required to be uniform and have a high strength characteristic. In its application to a binder for a fuel cell, a further characteristic is required such that it can readily be fibrillated.

To realize such desired properties, various conditions for polymerization of TFE have been studied, and various processes for producing PTFE have been proposed. However, there has been no proposal relating to the purity of TFE to be used for the polymerization of TFE.

An object of the present invention is to provide a process for producing PTFE which is uniform and stretchable at a high stretch ratio and which is excellent in the fibrillation property and has a high break strength.

DISCLOSURE OF THE INVENTION

The present invention provides a process for producing PTFE, which comprises polymerizing TFE in the presence of an aqueous medium and a polymerization initiator to obtain PTFE, wherein the content of impurities in TFE to be subjected to the polymerization is not more than 100 ppm. Further, the present invention provides the above process for producing PTFE, wherein the impurities comprise a saturated compound and an unsaturated compound, the content of the saturated compound is not more than 50 ppm, and the content of the unsaturated compound is not more than 1 ppm.

BEST MODE FOR CARRYING OUT THE INVENTION

In the process for producing PTFE of the present invention, TFE is subjected to aqueous dispersion polymerization, and the type and the content of impurities in TFE to be subjected to the polymerization, are substantially influential over the polymerizability of TFE or the properties of the resulting PTFE.

In the present invention, the content of impurities in TFE to be subjected to the polymerization, is not more than 100 ppm. If the content of impurities exceeds 100 ppm, the resulting PTFE tends to have a high standard specific gravity (hereinafter referred to as SSG) and low stretchability or break strength. Further, the smaller the content of impurities, the smaller the SSG, i.e. PTFE having a high average molecular weight can be obtained. Further, PTFE can be obtained which presents a highly stretchable low density tape and a stretchable porous material, which is uniform and stretchable at a high stretch rate and which has high break strength under stretching.

As the impurities in TFE, a saturated compound and an unsaturated compound may be mentioned. Specifically, the saturated compound may, for example, be a compound represented by the general formula $C_nH_mF_jCl_k$ (wherein n is an integer of 1 or 2, m, j and k are independently an integer of from 0 to 4, and j+k+m=2n+2). Specific examples of the saturated compound include, for example, $CH_2F_2$, $CHF_3$, $C_2H_3F_3$, $CF_2Cl_2$ and $CHF_2Cl$. Such a saturated compound acts as a chain transfer agent in the polymerization of TFE.

The saturated compound is preferably at least one member selected from the group consisting of $CH_2F_2$, $CHF_3$, $C_2H_3F_3$, $CF_2Cl_2$ and $CHF_2Cl$, more preferably $CH_2F_2$.

The unsaturated compound may be a compound containing a double bond and/or a triple bond. Specifically, it includes compounds such as $CF_2=CFH$, $CF_2=CFCl$, $CF_2=CH_2$, $CF_2=CHCl$, $CF_2=CCl_2$, $CFH=CH_2$, $CFH=CHCl$, $CFH=CCl_2$, $CFCl=CH_2$, $CFCl=CHCl$ and $CFCl=CCl_2$. Such an unsaturated compound acts as a copolymerizable component in the polymerization of TFE.

The unsaturated compound is preferably at least one member selected from the group consisting of $CF_2=CFH$, $CF_2=CFCl$, $CF_2=CH_2$, $CF_2=CHCl$, $CF_2=CCl_2$, $CFH=CH_2$, $CFH=CHCl$, $CFH=CCl_2$, $CFCl=CH_2$, $CFCl=CHCl$ and $CFCl=CCl_2$. More preferably, it is $CF_2=CFH$.

In the process of the present invention, it is preferred that the impurities comprise a saturated compound and an unsaturated compound, the content of the saturated compound is not more than 50 ppm, and the content of the unsaturated compound is not more than 1 ppm. More preferably, the content of the saturated compound is not more than 30 ppm, and the unsaturated compound is not more than 1 ppm. Further preferably, the content of the saturated compound is not more than 10 ppm, and the unsaturated compound is not more than 1 ppm. Most preferably, the content of the saturated compound is not more than 1 ppm, and the unsaturated compound is not more than 0.8 ppm.

As the polymerization of TFE progresses, TFE containing the impurities is continuously supplied into the autoclave. The unsaturated compound in the impurities will be consumed by the polymerization, and the content of the unsaturated compound in the gas phase in the autoclave will not substantially change. Whereas, the saturated compound in the impurities will be consumed only by the chain transfer and accordingly will gradually be accumulated in the gas phase of the autoclave, as the polymerization progresses. As a result, in the gas phase of the autoclave at the termination of the polymerization, the content of the saturated compound in the impurities may sometimes become from 10 to 20 times of the content at the initiation of the polymerization. The content of the saturated compound in the gas phase of the autoclave at the termination of the polymerization, is preferably at most 1000 ppm, more preferably at most 500 ppm, particularly preferably at most 300 ppm.

In the present invention, the aqueous dispersion polymerization of TFE is carried out usually by means of an aqueous medium containing a dispersing agent and a polymerization initiator. The polymerization temperature is preferably from 50 to 120° C., more preferably from 60 to 100° C. The polymerization pressure is preferably from 0.3 to 4.0 MPa, more preferably from 0.5 to 2.5 MPa.

The dispersing agent is more preferably an anionic surfactant having little chain transfer property, particularly preferably a fluorocarbon type surfactant. Specific examples include, for example, the general formula $XC_nF_{2n}COOM$ (wherein X is a hydrogen atom, a chlorine atom, a fluorine atom or a $(CF_3)_2CF$ group, M is a hydrogen atom, $NH_4$ or an alkali metal, and n is an integer of from 6 to 12, the same applies hereinafter), the general formula $C_mF_{2m+1}O(CF(CF_3)CF_2O)_pCF(CF_3)$ COOM (wherein m is an integer of from 1 to 12, and p is an integer of from 0 to 5), the general formula $C_nF_{2n+1}SO_3M$, and the general formula $C_nF_{2n+1}CH_2CH_2SO_3M$. A perfluorocarbon type surfactant is more preferred and may, for example, be $C_7F_{15}COONH_4$, $C_8F_{17}COONH_4$, $C_9F_{19}COONH_4$, $C_{10}F_{21}COONH_4$, $C_7F_{15}COONa$, $C_8F_{17}COONa$, $C_9F_{19}COONa$, $C_7F_{15}COOK$, $C_8F_{17}COOK$, $C_9F_{19}COOK$ or $C_3F_7O(CF(CF_3)CF_2O)_2CF(CF_3)COONH_4$. These may be used alone or in combination as a mixture of two or more of them. The content of the dispersing agent is preferably from 250 to 5000 ppm, more preferably from 500 to 3000 ppm, based on the mass of water to be used. To further improve the stability of the aqueous dispersion, the dispersing agent may preferably additionally added during the polymerization.

As the polymerization initiator, a water-soluble radical polymerization initiator or a water-soluble redox type polymerization initiator is preferred. The water-soluble radical polymerization initiator is preferably a persulfate such as ammonium persulfate or potassium persulfate, or a water-soluble organic peroxide such as disuccinic acid peroxide, diglutaric acid peroxide or tert-butylhydroperoxide. These initiators may be used alone or in combination as a mixture of two or more of them.

As the content of the polymerization initiator is small, PTFE having small SSG tends to be obtained. If the content of the polymerization initiator is too small, the polymerization rate tends to be too slow, and if it is too large, SSG of the resulting PTFE tends to be high. The content of the polymerization initiator is preferably from 30 to 1000 ppm, more preferably from 50 to 500 ppm, based on the mass of water to be used.

In the present invention, the aqueous dispersion polymerization of TFE is preferably carried out in the presence of a stabilizer. As the stabilizer, paraffin wax, fluorine-type oil, a fluorine type solvent or silicone oil, is, for example, preferred. These may be used alone or in combination as a mixture of two or more of them. It is particularly preferred to carry out the polymerization in the presence of paraffin wax. The paraffin wax may be liquid, semi-solid or solid at room temperature and is preferably a saturated hydrocarbon having a carbon number of at least 12. The melting point of the paraffin wax is preferably usually from 40 to 65° C., more preferably from 50 to 65° C. The amount of the paraffin wax is preferably from 0.1 to 12 mass %, more preferably from 0.1 to 8 mass %, based on the mass of water to be used.

The aqueous dispersion polymerization is carried out usually by gently stirring TFE with the above-described aqueous medium, dispersing agent, polymerization initiator, stabilizer, etc. The stirring conditions are controlled so that the formed primary particles of PTFE in the aqueous dispersion will not be coagulated. The aqueous dispersion polymerization is carried out usually under such a condition that the concentration of the primary particles of PTFE in the aqueous dispersion is within a range of from 15 to 40 mass %.

By the aqueous dispersion polymerization, an aqueous dispersion having primary particles of PTFE dispersed therein, is obtainable. The particle sizes of primary particles of PTFE in the aqueous dispersion usually have a wide distribution ranging from 0.02 to 1.0 $\mu$m, and the average particle diameter is from about 0.1 to 0.4 $\mu$m.

From the obtained aqueous dispersion polymerization emulsion, the primary particles of PTFE are coagulated and dried to obtain a PTFE fine powder. As such a coagulating method, it is preferred to stir the aqueous dispersion at a high speed to have the primary particles of PTFE coagulated. At that time, it is also preferred to add a coagulant. As a coagulant, ammonium carbonate, a polyvalent organic salt, a mineral acid, a cationic surfactant or an alcohol is, for example, preferred, and ammonium carbonate is more preferred.

Drying of PTFE obtained in a wet state by coagulation, can be carried out at an optional temperature, but preferably within a range of from 100 to 250° C., more preferably within a range of from 130 to 200° C. By the drying, a PTFE fine powder is obtained.

Now, the present invention will be described in further detail with reference Examples, but the present invention is by no means restricted thereto. In the following, "parts" represents "parts by mass". Example 1 is a Working Example of the present invention, and Example 2 is a Comparative Example. Here, evaluation of the stretchability, measuring methods for breaking strength and apparent density and an analytical method for impurities were carried out by the following methods.

(1) Method for Evaluation of Stretchability 600 g of PTFE fine powder was put into a glass bottle, and a lubricant IsoperG (tradename, manufactured by Exxon) was added in a proportion of 20 mass % and mixed by rotation at 100 rpm for 30 minutes. The blended PTFE was aged at room temperature for 24 hours. This PTFE was pressed under a pressure of 0.2 MPa for 120 seconds to obtain a perform having a diameter of 68 mm. This perform was extruded through an orifice having a diameter of 0.10 mm, and the extruded product was rolled to a thickness of 0.11 mm. The rolled sheet was formed into a strip having a length of 5 cm and a width of 2 cm and stretched 8.4 times at a rate of 5 cm/sec. at a temperature of 300° C. by a tensile tester. The uniformity of the stretched tape was visually evaluated. Further, the rolled sheet was stretched 10 times, and the uniformity of the stretched tape was visually evaluated.

(2) Measuring Method for Break Strength

It was measured in accordance with JIS K6885. The stretched tape for evaluation was a test piece having a length of 200 mm and a width of 13 mm cutout from the rolled tape prepared in (1). On both sides of the test piece, gage marks were clearly drawn at 25 mm apart from the respective sides. The test piece was attached so that the gripping distance was 100 mm, and the test piece was pulled at a rate of 200 mm/min, whereby the maximum load per unit area till breakage was measured when breaking started between the gage marks. An average value of five measurements was taken as the break strength.

(3) Measuring Method for Apparent Density

It was measured in accordance with JIS K6885. A test piece was obtained by cutting out about 1 m from the thread seal tape prepared in (1), substantially perpendicularly to the longitudinal direction. The length of the test piece was measured down to 0.1 cm, and one place of decimals was rounded by counting fractions of 0.5 or more as a whole number and disregarding the rest. For the width, five portions with a substantially constant spaces in the longitudinal direction of the test piece were measured down to 0.01 mm, and their average value was obtained, and the two places of decimals were rounded by counting fractions of 0.5 and more as a whole number and disregarding the rest. For the thickness, the test piece was folded into ten sheets to have substantially the same length, and the center portions of the length and the width were measured down to 0.01 mm, and 0.1 time thereof was taken as the thickness. The test piece, of which the length, the width and the thickness were measured, was accurately weighed down to 10 mmg, and the mass per unit volume was calculated.

(4) Analytical Method for Impurities

For the analysis of the impurities, capillary gas chromatograph was used. The carrier gas was helium gas, and the columns used were AL203/KCL50m (diameter: 0.32 mm) and Pora PLOT Q25m (diameter: 0.32 mm). With respect to the measuring conditions, the initial column temperature was 50° C., the temperature was maintained for 5 minutes, and then the temperature was raised to 150° C. at a rate of 5° C./min, whereupon the temperature was maintained for 10 minutes. The injection temperature was 220° C., the temperature of the FID detector was 220° C., and the split ratio was 50:1. TFE to be measured, was sampled into a micro syringe, and 1 ml was injected from the injection inlet.

EXAMPLE 1

Into a 100 l-autoclave with a stirring apparatus, 740 g of a paraffin wax (a mixture of saturated hydrocarbons having carbon numbers of at least 12, melting point: 52° C.), 60 l of ultrapure water and 35 g of ammonium perfluorooctanoate, were charged. Then, nitrogen purging and deaeration were carried out, whereupon the temperature was raised to 70° C. After the temperature was stabilized, TFE was introduced wherein the content of a saturated compound containing $CH_2F_2$ as the main component, was 7.8 ppm, and the content of an unsaturated compound containing $CF_2=CFH$ as the main component, was 0.6 ppm, to a pressure of 1.9 MPa. While stirring the content, the polymerization was initiated by incorporating 10.8 g of disuccinic acid peroxide as dissolved in 1 l of water. Thereafter, the polymerization temperature was maintained to be constant at 70° C. Further, as the polymerization progressed, TFE was consumed, and the internal pressure of the autoclave decreased. Therefore, in order to maintain the pressure to be constant, TFE having the same purity as TFE initially charged, was continuously supplied. Further, upon expiration of 30 minutes from the initiation of the polymerization, 58 g of ammonium perfluorooctanoate was added as dissolved in 1 l of water. After the initiation of the polymerization, when the amount of TFE supplied became 25 kg, the stirring and supply of TFE were stopped. In TFE in the gas phase of the autoclave after the polymerization, the saturated compound was contained in an amount of 156.7 ppm, and the unsaturated compound was contained in an amount of 0.8 ppm. TFE was purged, and replaced by nitrogen to obtain a PTFE aqueous dispersion. The average particle diameter of dispersed PTFE was 0.25 $\mu$m, and the distribution was from 0.15 to 0.40 $\mu$m. The polymerization time was 126 minutes. The obtained dispersion was coagulated, and PTFE in a wet state was separated and dried at 150° C. to obtain a PTFE fine powder. SSG of the obtained PTFE was 2.176. The apparent density was measured, and the stretchability was evaluated, whereby both tapes stretched 8.4 times and 10 times were uniform.

EXAMPLE 2

A PTFE aqueous dispersion was obtained in the same manner as in Example 1 except that TFE wherein the content of the saturated compound containing $CH_2F_2$ as the main component was 110.4 ppm, and the content of an unsaturated compound containing $CF_2=CFH$ as the main component was 1.3 ppm, as impurities, was used as TFE initially charged for the polymerization and continuously supplied during the polymerization. In TFE in the gas phase of the autoclave after the polymerization, the saturated compound was contained in an amount of 2085.1 ppm, and the unsaturated compound was contained in an amount of 1.5 ppm. The polymerization time was 128 minutes. From this PTFE aqueous dispersion, a PTFE fine powder was obtained in the same manner as in Example 2. SSG of the obtained PTFE was 2.182. The apparent density was measured and the stretchability was evaluated, whereby the tape stretched 8.4 times was partially non-uniform, and the tape stretched ten times, broke during the stretching.

TABLE 1

| Items for measurements | Example 1 | Example 2 |
|---|---|---|
| Content of impurities in TFE in gas phase in autoclave (ppm) | | |
| Before polymerization | | |
| Saturated compound | 7.8 | 110.4 |
| Unsaturated compound | 0.6 | 1.3 |
| After polymerization | | |
| Saturated compound | 156.7 | 2085.1 |
| Unsaturated compound | 0.8 | 1.5 |
| Polymerization time (min) | 126 | 128 |
| Solid content concentration in aqueous dispersion (%) | 24.1 | 23.9 |
| SSG of PTFE | 2.176 | 2.182 |
| Test results of stretching 8.4 times | | |
| Apparent density (g/ml) | 0.23 | 0.22 |
| Stretching evaluation | Uniform | Non-uniform |
| Break strength (N/mm$^2$) | 0.122 | 0.075 |
| Test results of stretching 10 times | | |
| Apparent density (g/ml) | 0.20 | (Broke) |
| Stretching evaluation | Uniform | (Broke) |

As described in the foregoing, PTFE produced by the process of the present invention has small SSG and is excellent in stretchability, and it presents a stretched porous material which is uniform and has high break strength.

The entire disclosures of Japanese Patent Application No. 2001-72956 filed on Mar. 14, 2001 and Japanese Patent Application No. 2001-348060 filed on Nov. 13, 2001 including specifications, claims and summaries are incorporated herein by reference in their entireties.

What is claimed is:

1. A process for producing a tetrafluoroethylene polymer, which comprises polymerizing tetrafluoroethylene in the presence of an aqueous medium and a polymerization initiator to obtain a tetrafluoroethylene polymer, wherein the impurities in the tetrafluoroethylene to be subjected to the polymerization comprise a saturated compound and an unsaturated compound, the content of the saturated compound is not more than 50 ppm, and the content of the unsaturated compound is not more than 1 ppm.

2. The process for producing a tetrafluoroethylene polymer according to claim 1, wherein the saturated compound is a compound represented by $C_nH_mF_jCl_k$ (wherein n is an integer of 1 or 2, m, j and k are independently an integer of from 0 to 4, and j+k+m=2n+2).

3. The process for producing a tetrafluoroethylene polymer according to claim 1, wherein the saturated compound is at least one member selected from the group consisting of $CH_2F_2$, $CHF_3$, $C_2H_3F_3$, $CF_2Cl_2$ and $CHF_2Cl$.

4. The process for producing a tetrafluoroethylene polymer according to claim 1, wherein the unsaturated compound is a compound containing a double bond and/or a triple bond.

5. The process for producing a tetrafluoroethylene polymer according to claim 1, wherein the unsaturated compound is at least one member selected from the group consisting of $CF_2$=CFH, $CF_2CFCl$, $CF_2$=$CH_2$, $CF_2$=CHCl, $CF_2$=$CCl_2$, $CFHCH_2$, CFH=CHCl, CFH=$CCl_2$, $CFC_1CH_2$, $CFC_1CHCl$ and CFCl=$CCl_2$.

6. The process for producing a tetrafluoroethylene polymer according to claim 1, wherein the content of the saturated compound is not more than 30 ppm.

7. The process for producing a tetrafluoroethylene polymer according to claim 6, wherein the content of the saturated compound is not more than 10 ppm.

8. The process for producing a tetrafluoroethylene polymer according to claim 6, wherein the content of the saturated compound is not more than 1 ppm, and the content of the unsaturated compound is not more than 0.8 ppm.

9. The process for producing a tetrafluoroethylene polymer according to claim 1, wherein the saturated compound is $CH_2F_2$.

10. The process for producing a tetrafluoroethylene polymer according to claim 1, wherein the unsaturated compound is $CF_2$=CFH.

11. A tetrafluoroethylene polymer prepared by the process of claim 1.

12. A tetrafluoroethylene polymer prepared by the process of claim 6.

13. A tetrafluoroethylene polymer prepared by the process of claim 7.

14. A tetrafluoroethylene polymer prepared by the process of claim 8.

* * * * *